(12) United States Patent
Prager et al.

(10) Patent No.: US 11,046,427 B2
(45) Date of Patent: Jun. 29, 2021

(54) SAFE UNMANNED AIRCRAFT

(71) Applicant: Wing Aviation LLC, Mountain View, CA (US)

(72) Inventors: Andre Prager, Sunnyvale, CA (US); Adam Woodworth, Santa Clara, CA (US)

(73) Assignee: Wing Aviation LLC., Mountain View, CA (US)

( * ) Notice: Subject to any disclaimer, the term of this patent is extended or adjusted under 35 U.S.C. 154(b) by 382 days.

(21) Appl. No.: 16/119,298

(22) Filed: Aug. 31, 2018

(65) Prior Publication Data
US 2020/0070968 A1 Mar. 5, 2020

(51) Int. Cl.
*B64C 27/22* (2006.01)
*B64C 29/00* (2006.01)
*B64C 39/02* (2006.01)

(52) U.S. Cl.
CPC .......... *B64C 29/0025* (2013.01); *B64C 27/22* (2013.01); *B64C 39/024* (2013.01); *B64C 2201/021* (2013.01); *B64C 2201/145* (2013.01); *B64C 2201/146* (2013.01)

(58) Field of Classification Search
CPC . B64C 39/024; B64C 27/22; B64C 2201/145; B64C 2201/021; B64D 25/00
See application file for complete search history.

(56) References Cited

U.S. PATENT DOCUMENTS

| | | | |
|---|---|---|---|
| 6,742,741 B1 | 6/2004 | Rivoli | |
| 7,866,610 B2 * | 1/2011 | Bousfield | B64C 3/18 |
| | | | 244/218 |
| 9,545,991 B1 * | 1/2017 | Alley | B64C 3/40 |
| 9,613,539 B1 | 4/2017 | Lindskog et al. | |
| 9,802,702 B1 | 10/2017 | Beckman et al. | |

(Continued)

FOREIGN PATENT DOCUMENTS

| | | |
|---|---|---|
| KR | 10-1726654 B1 | 4/2017 |
| WO | 2009/059173 A1 | 5/2009 |
| WO | 2015/157114 A1 | 10/2015 |

OTHER PUBLICATIONS

International Search Report issued in connection with PCT/US2019/049174 dated Dec. 20, 2019, 5 pages.

(Continued)

*Primary Examiner* — Timothy D Collins
*Assistant Examiner* — Keith L Dixon
(74) *Attorney, Agent, or Firm* — McDonnell Boehnen Hulbert & Berghoff LLP

(57) ABSTRACT

An unmanned aerial vehicle (UAV) is provided including a fuselage, a pair of wings extending outwardly from the fuselage, and a deployable surface moveable from a first undeployed position during normal flight to a second deployed position when there is a system failure during flight. A method of adjusting a center of pressure of a UAV is also provided including the steps of providing a UAV with a fuselage, a pair of wings extending outwardly from the fuselage, and a deployable surface moveable from a first undeployed position during normal flight to a second deployed position when there is a system failure during flight, sensing when there is a system failure, and moving the deployable surface from the first undeployed position to the second deployed position.

18 Claims, 16 Drawing Sheets

(56) References Cited

U.S. PATENT DOCUMENTS

| | | | |
|---|---|---|---|
| 10,124,890 B2* | 11/2018 | Sada-Salinas | ........... B64D 1/02 |
| 2014/0008498 A1 | 1/2014 | Reiter | |
| 2018/0072414 A1 | 3/2018 | Cantrell et al. | |
| 2018/0281924 A1* | 10/2018 | Grubb | ................... B64C 39/024 |
| 2019/0276140 A1* | 9/2019 | Poltorak | ............... B60W 20/10 |

OTHER PUBLICATIONS

Written Opinion issued in connection with PCT/US2019/049174 dated Dec. 20, 2019, 5 pages.

* cited by examiner

SAFE UNMANNED AIRCRAFT

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

UAVs may be used to deliver a payload to, or retrieve a payload from, an individual or business. In some cases, the UAV may fail, such as when there is a system failure and/or the motors stop working. In such situations, the UAV will fall or plummet to ground, which is not desirable as the UAV may damage itself or ground-based objects when the UAV strikes the ground. In addition, most winged aircraft have a center of gravity that is positioned forward from a center of pressure for aerodynamic forward flight. A resulting moment caused by the center of pressure and the center of gravity causes the UAV to fall "nose down" when the motors stop working resulting in a high terminal velocity and increased force resulting when the UAV strikes the ground.

As a result, it would be desirable to provide a UAV that has improved features that provides that the UAV falls more "softly" when there is a system failure and/or the motors stop working, such that there is a softer landing when the UAV ultimately returns to the ground during such a flight failure.

SUMMARY

The present embodiments advantageously provide a UAV with deployable surfaces that may automatically deploy to provide a greater surface area that is parallel to the ground when the UAV experiences a system failure and/or the motors stop working. In one example, the nose section of the UAV may include a plate that extends from a first undeployed position to a second deployed position where the plate extends outwardly from the nose section when the motors stop working. The nose plate may rotate or extend linearly forward from the nose section to provide a greater surface area on the underside of the nose section of the UAV.

Therefore, when the nose plate is deployed, the greater surface area provided by the nose plate perpendicular to the downward movement of the UAV allows the UAV to return to the ground more softly than if it was in a nose dive as the UAV has a lower terminal velocity when the UAV is in the normal forward flight position with the major lower surfaces of the UAV facing the ground. If the UAV is light enough, the UAV may fall to the ground "like a leaf," rather than in a nose dive.

The deployable surfaces may also take the form of boom extensions that are moved into a forward position from the booms, either through rotation about a pivot axis or moving forward linearly to provide a greater surface area to the bottom of the UAV. The boom extensions may also take the form of boom sideboards that rotate about a longitudinal pivot axis to a side of the booms, providing a greater surface area to the underside of the booms.

The boom extensions provide the same advantages as the nose plate, allowing the UAV to stay in a normal flight position with the major surfaces on the bottom of the UAV facing the ground perpendicular to the direction of descent, providing maximum drag to provide for a softer, more stable, landing on the ground The greater surface of area created by the nose plate or boom extensions moves a center of pressure of the UAV towards, or in alignment with, a center of gravity of the UAV, thereby reducing or eliminating a moment caused by a difference between the center of pressure and center of gravity and reducing the possibility that the UAV enters into a nose dive when the there is a system failure or the motors stop working.

In one aspect, an unmanned aerial vehicle (UAV) is provided that includes a fuselage, a pair of wings extending outwardly from the fuselage; and a deployable surface moveable from a first undeployed position during normal flight to a second deployed position when there is a system failure during flight. The deployable surface may take the form of an extendable nose plate or boom extensions on the UAV.

In another aspect, a method of adjusting a center of pressure of a UAV is provided, including the (i) providing a UAV with a fuselage, a pair of wings extending outwardly from the fuselage, and a deployable surface moveable from a first undeployed position during normal flight to a second deployed position when there is a system failure during flight; (ii) sustaining a system failure; and (iii) moving the deployable surface from the first undeployed position to the second deployed position.

The present embodiments further provide means for moving a center of pressure towards, or in alignment with, a center of gravity of the UAV using deployable surfaces.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
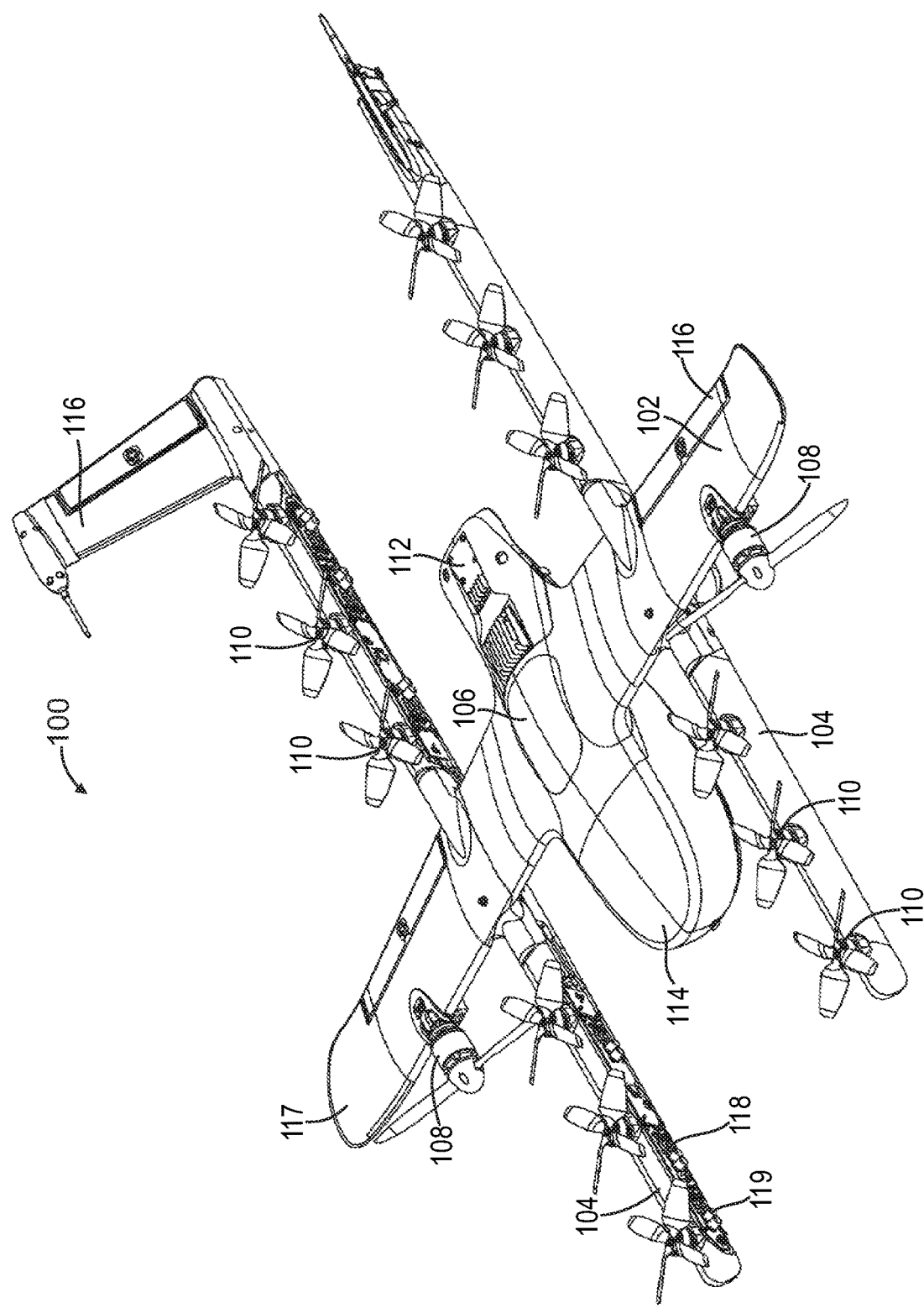
FIG. 1A is a perspective view of an example unmanned aerial vehicle 100, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

The present embodiments advantageously provide a UAV with deployable surfaces that may automatically deploy to provide a greater surface area that is parallel to the ground when the UAV experiences a system failure and/or the motors stop working. The greater surface area caused by the deployed surfaces provides maximum drag on the UAV in a direction of downward travel. In one example, the nose section of the UAV may include a plate that extends from a first undeployed position to a second deployed position where the plate extends outwardly from the nose section when the motors stop working. The nose plate may rotate or extend linearly forward from the nose section to provide a greater surface area on the underside of the nose section of the UAV.

Therefore, when the nose plate is deployed, the greater surface area provided by the nose plate perpendicular to the downward movement of the UAV allows the UAV to return to the ground more softly than if it was in a nose dive as the UAV has a lower terminal velocity when the UAV is in the normal forward flight position with the major lower surfaces of the UAV facing the ground. If the UAV is light enough, the UAV may fall to the ground "like a leaf," rather than in a nose dive.

The deployable surfaces may also take the form of boom extensions that are moved into a forward position from the boom, either through rotation about a pivot axis or moving forward linearly to provide a greater surface area to the bottom of the UAV. The boom extensions may also take the form of boom sideboards that rotate about a longitudinal pivot axis to a side of the booms, providing a greater surface area to the underside of the booms.

The boom extensions provide the same advantages as the nose plate, allowing the UAV to stay in a normal horizontal flight position with the major surfaces on the bottom of the UAV facing the ground perpendicular to the direction of descent, providing maximum drag to provide for a softer, more stable, landing on the ground.

The greater surface of area created by the nose plate or boom extensions moves a center of pressure of the UAV towards, or in alignment with, a center of gravity of the UAV, thereby reducing or eliminating a moment caused by a difference between the center of pressure and center of gravity and reducing the possibility that the UAV enters into a nose dive when there is a system failure and/or the motors stop working.

II. Illustrative Unmanned Vehicles

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1A illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
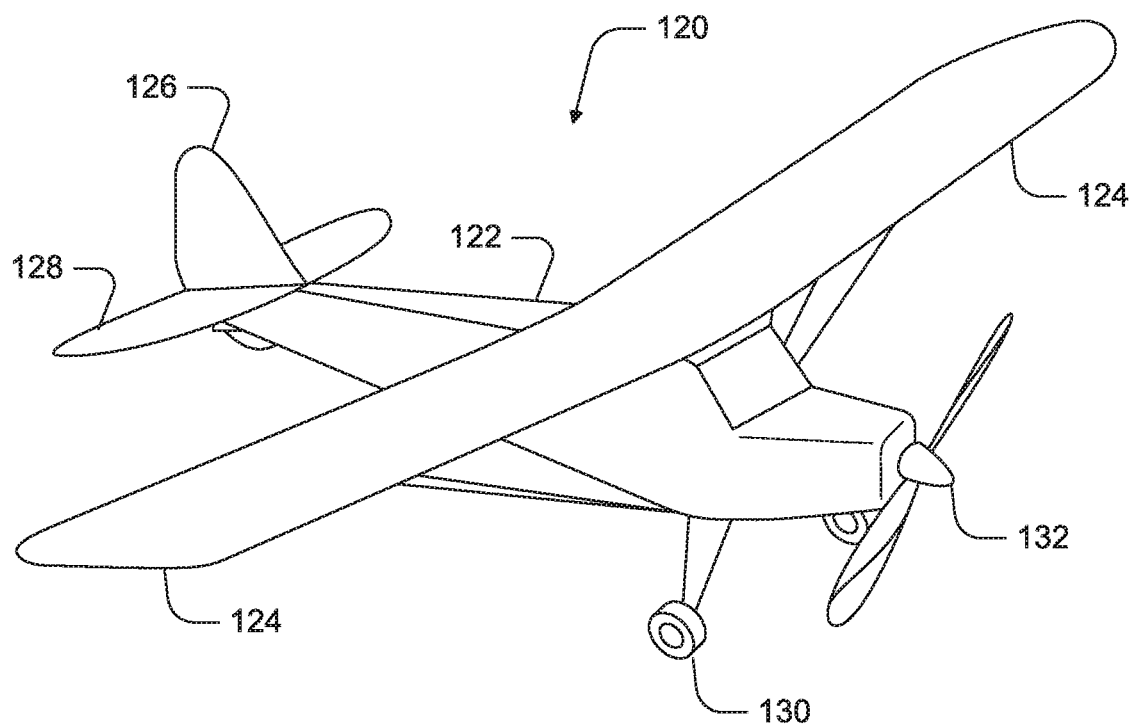
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
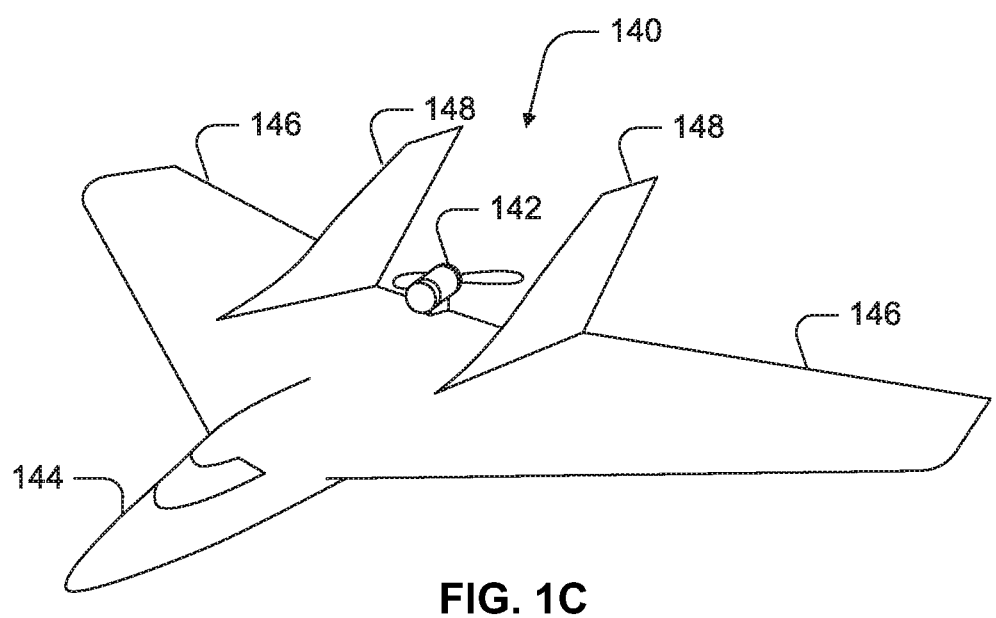
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
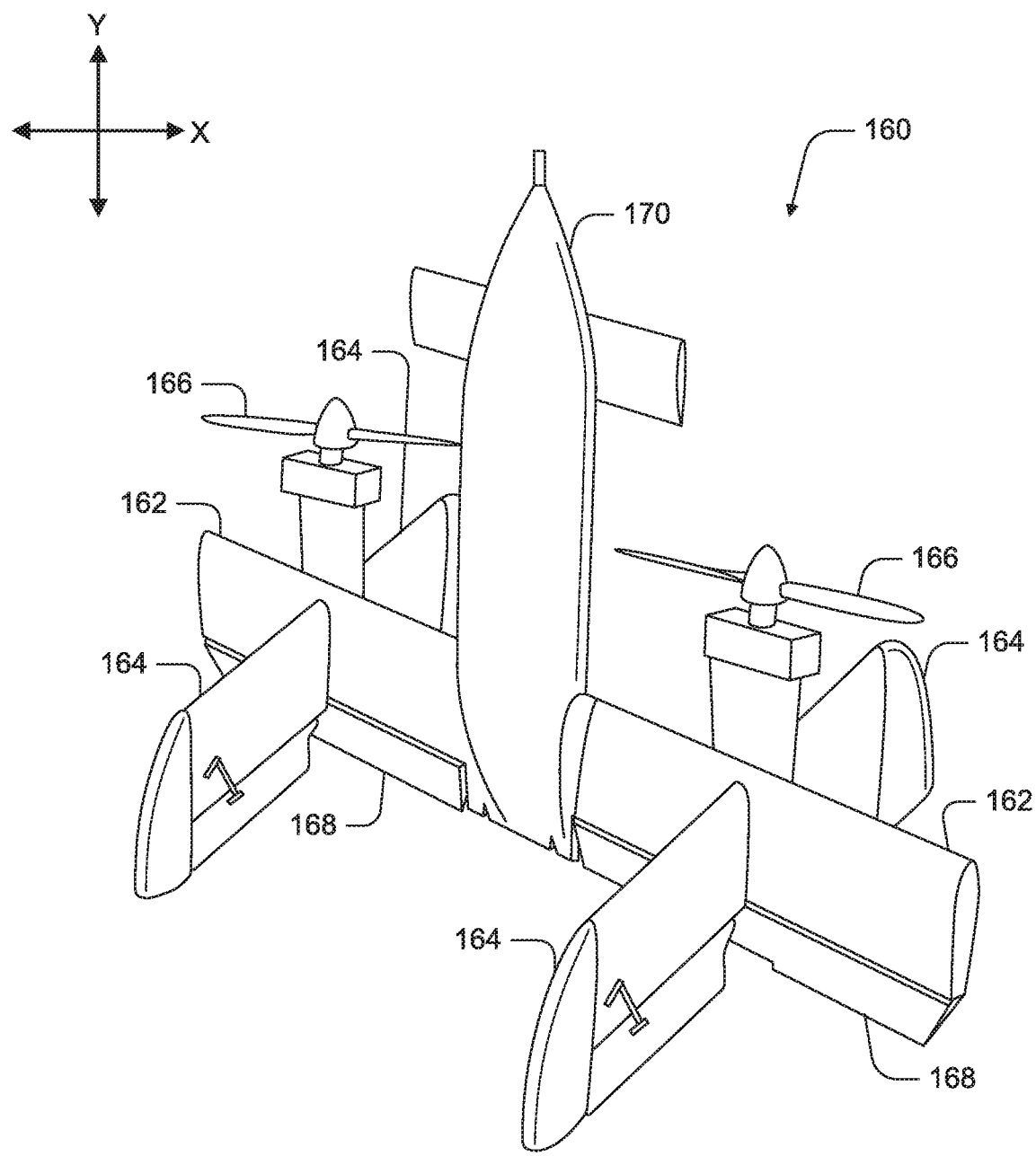
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative UAV Components

Figure 2:
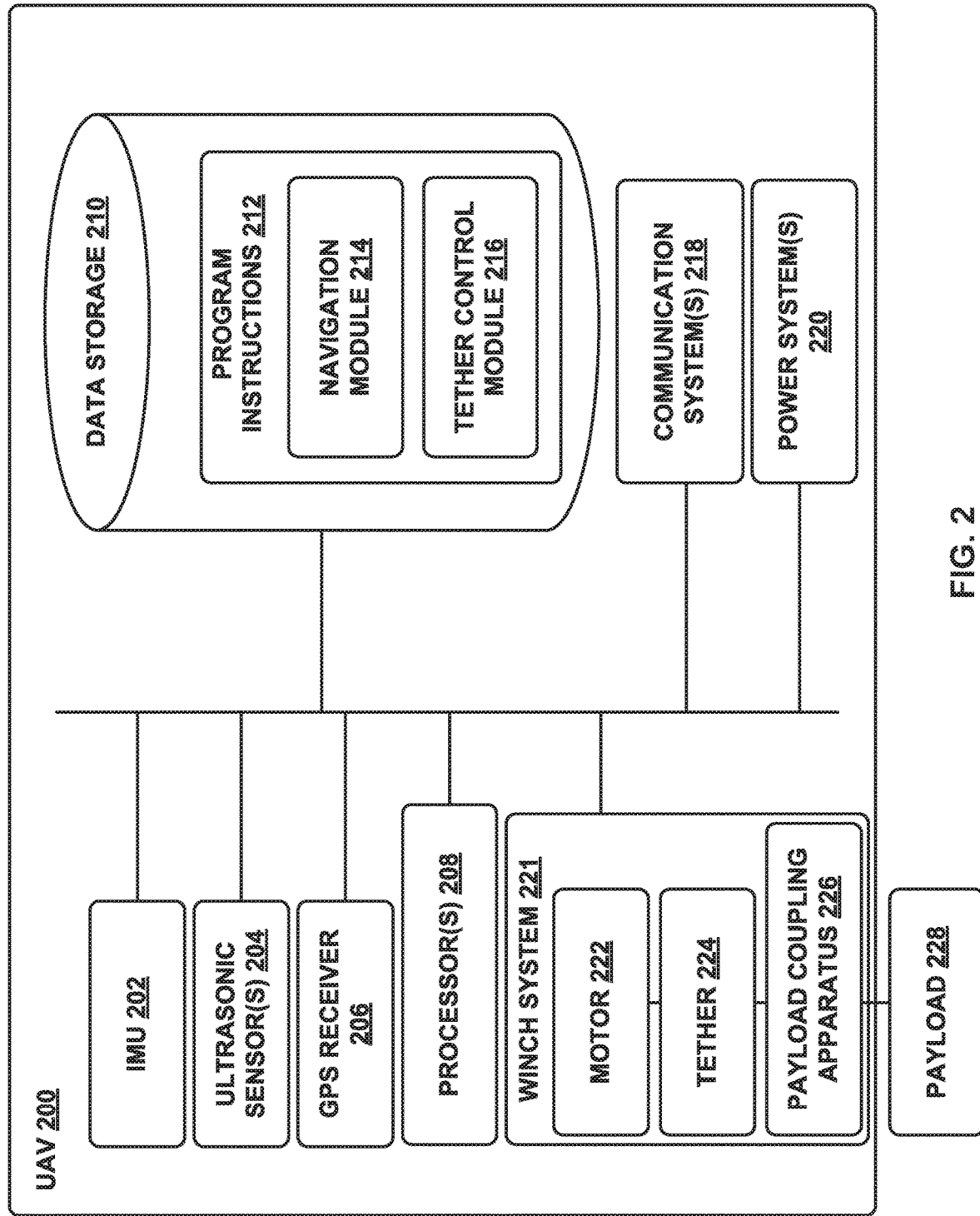
FIG. 2 is a simplified block diagram illustrating components of an unmanned aerial vehicle, according to an example embodiment

FIG. 2 is a simplified block diagram illustrating components of a UAV 200, according to an example embodiment. UAV 200 may take the form of, or be similar in form to, one of the UAVs 100, 120, 140, and 160 described in reference to FIGS. 1A-1D. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron (s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

Figure 3:
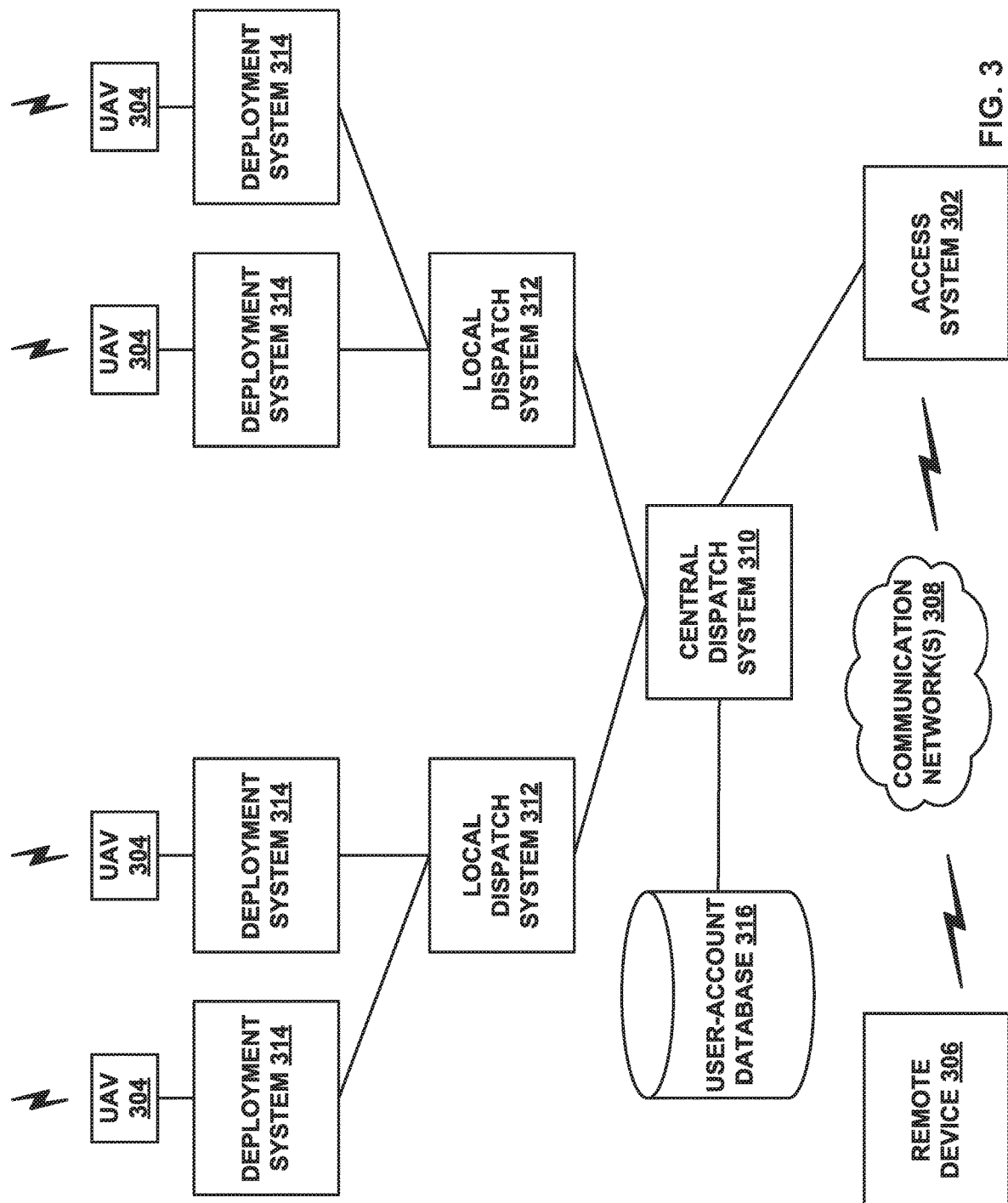
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1D. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Example Deployable Surfaces on a UAV

Figure 4A:
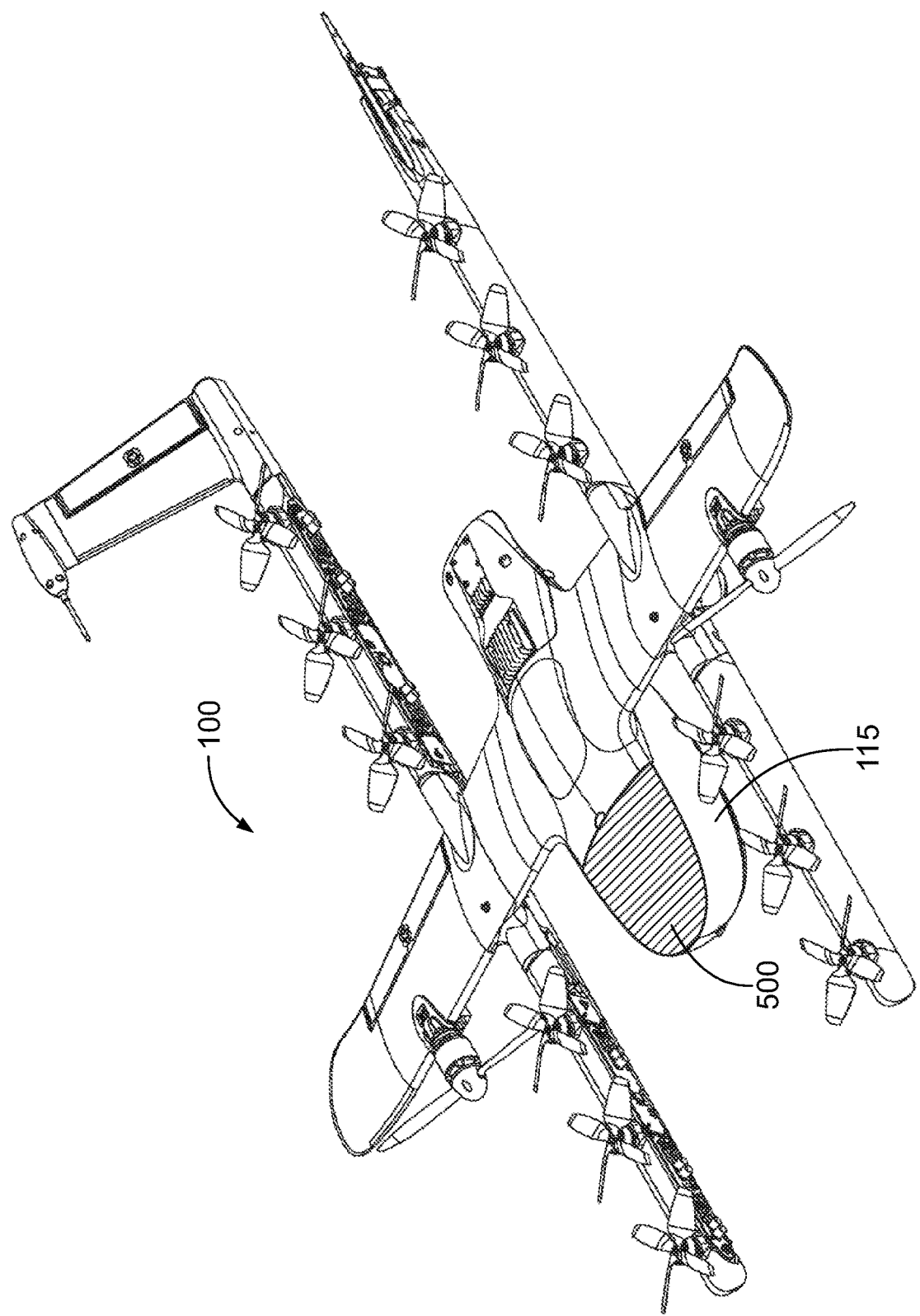
FIG. 4A is a perspective view of aerial vehicle 100 having a deployable nose plate 500 in an undeployed position, according to an example embodiment.

FIG. 4A is a perspective view of aerial vehicle 100 having a deployable nose plate 500 in an undeployed position, according to an example embodiment. In FIG. 2A, nose plate 500 is shown positioned on the top of nose section 115 of UAV 100. When UAV experiences a system failure and/or the motors stop working, the UAV will eventually fall to the ground, where it may strike an earth-based object. In most winged aircraft, the center of pressure of the UAV is behind the center of gravity of the UAV, resulting in a moment caused between the center of pressure and the center of gravity to cause the UAV to enter into a nose dive and strike the earth at a high rate of speed. Therefore, it is desirable to slow the descent of the UAV by deploying additional surfaces at the front of the UAV (or reducing the surface area in the back) to move the center of pressure forward towards, or in alignment with, the center of gravity of the UAV.

Figure 4B:
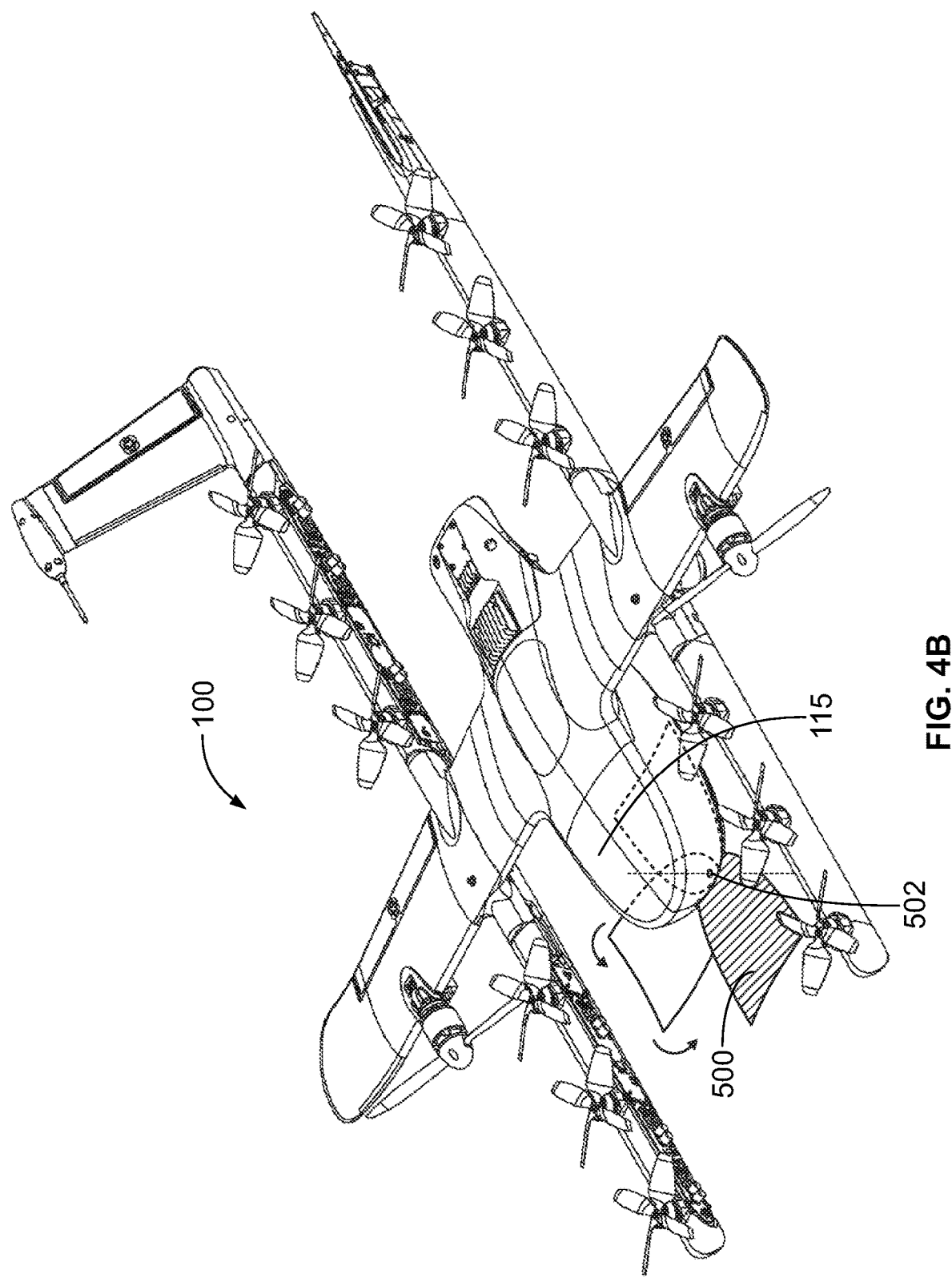
FIG. 4B is a perspective view of aerial vehicle 100 with nose plate 500 rotated into a deployed position, according to an example embodiment.

FIG. 4B is a perspective view of aerial vehicle 100 with nose plate 500 rotated into a deployed position, according to an example embodiment. In FIG. 4B, the nose plate 500 is shown positioned on a bottom of nose section 115, although the nose plate 500 could also be positioned on the top nose section 115 as shown in FIG. 4A, or somewhere in between the top and bottom of nose section 115. The greater surface area at the front of the UAV achieved by deployment of nose plate 500 moves the center of pressure forward, or in alignment with, the center of gravity of the UAV, causing the UAV to remain in a forward flight or hover orientation, with a large surface area providing maximum drag on the UAV to slow the descent of the UAV towards the ground.

When the motors stop working, the nose plate may be automatically deployed and rotated into the deployed position shown in FIG. 4B. For example, the nose plate 500 may be spring loaded, such that when a system failure is sensed or when electrical power is lost, or when it is sensed that the motors stop working, a latch may be moved and the spring loaded nose plate 500 may be spring-driven to rotate into position about pivot point 502. Various other means of moving the nose plate 500 into the deployed position may also be used, including rotary actuators and the like. In addition, the deployable surfaces may also be passively deployed. For example, a spring loaded pin could be held in a locked position via electrical power (e.g., a solenoid) from the propulsion system. If propulsion power is lost, the power to the solenoid is lost too, and the pin releases the deployable surface into a deployed position.

Figure 4C:
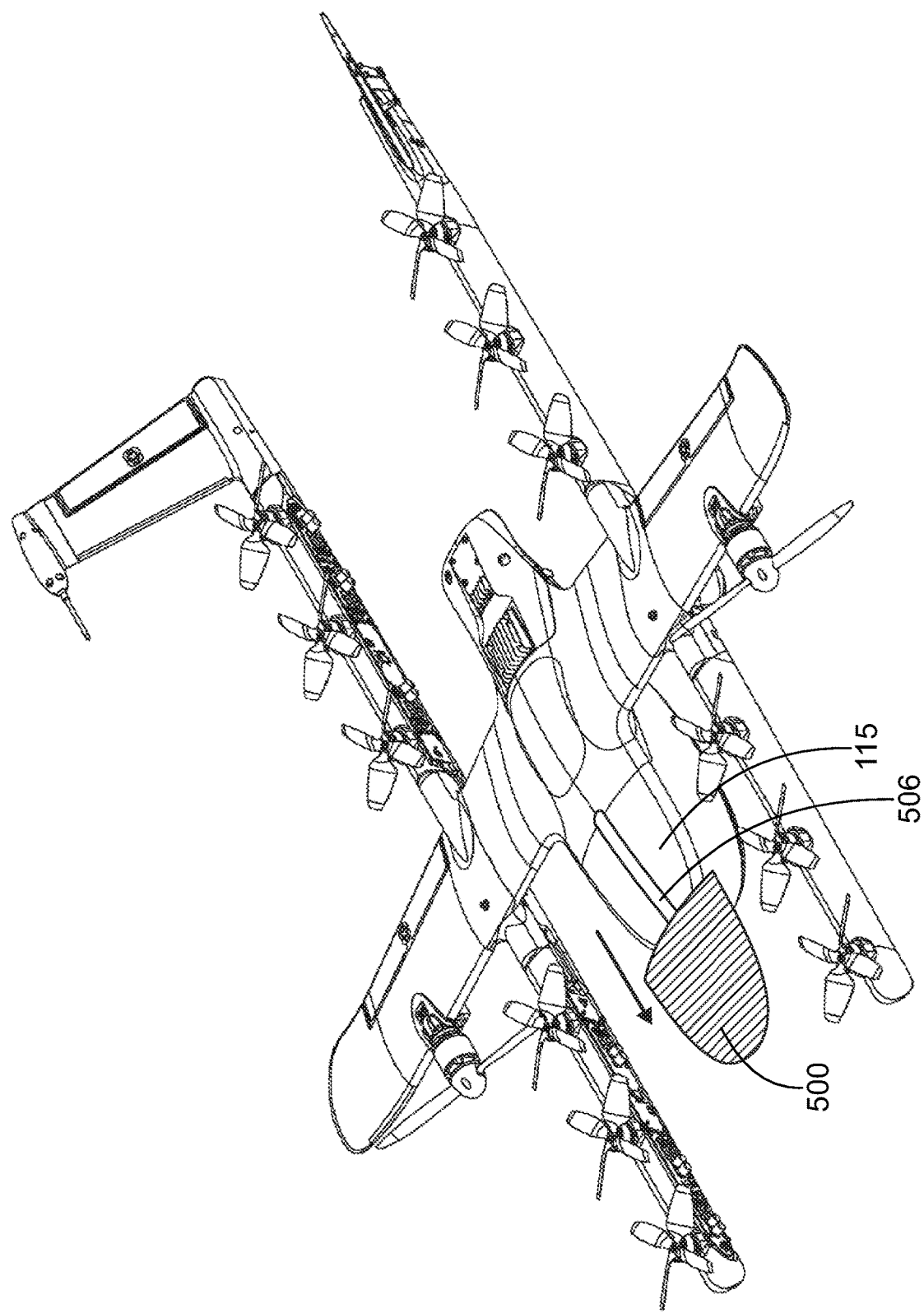
FIG. 4C is a perspective view of aerial vehicle 100 shown in FIG. 4A with nose plate 500 moved linearly into a deployed position, according to an example embodiment.

FIG. 4C is a perspective view of aerial vehicle 100 shown in FIG. 4A with nose plate 500 moved linearly into a deployed position, according to an example embodiment. In FIG. 4C, nose plate 500 is moved forward in a linear manner to move into the deployed position shown. Linear movement of nose plate 500 may be achieved using a linear actuator, a cylinder, or spring driven, among others ways of deploying the nose plate 500 forward in a linear manner. Deployment may be guided by slot 506 on nose section 115. Nose plate 500 shown deployed in FIG. 4C operates in the same manner as nose plate 500 shown in FIG. 4B, but is deployed differently.

Figure 5:
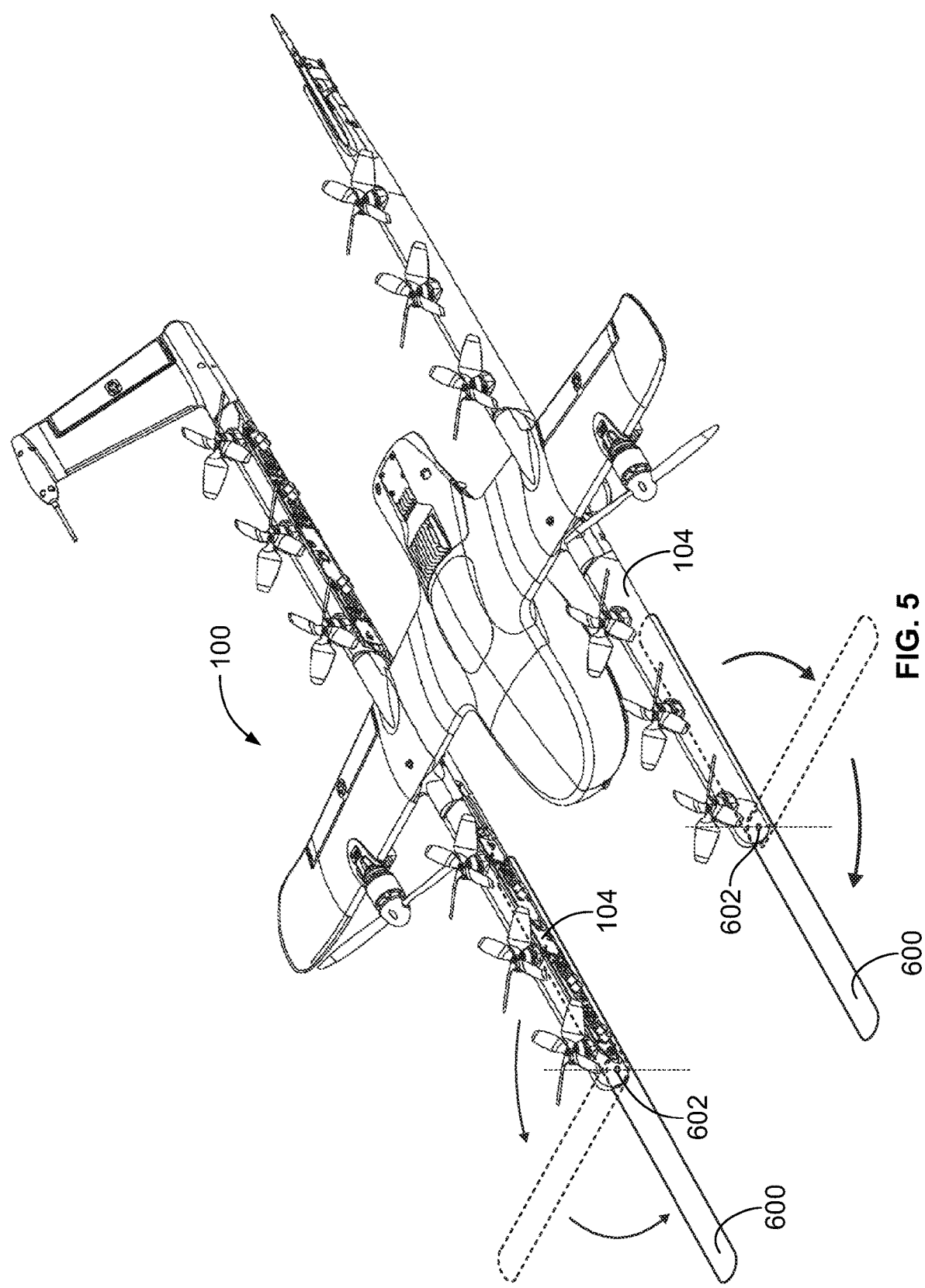
FIG. 5 is a perspective view of aerial vehicle 100 having boom extensions 600 rotated into a deployed position in the front of booms 104, according to an example embodiment.

FIG. 5 is a perspective view of aerial vehicle 100 having boom extensions 600 rotated into a deployed position in the front of booms 104, according to an example embodiment. In FIG. 5, the boom extensions are shown rotating into the deployed position about pivot axis 602. As with nose plate 500 described above, the greater surface area at the front of the UAV achieved by deployment of boom extensions 600 moves the center of pressure forward, or in alignment with, the center of gravity of the UAV, causing the UAV to remain in a forward flight or hover orientation, with a large surface area providing maximum drag on the UAV to slow the descent of the UAV towards the ground.

When the motors stop working, the boom extensions 600 may be automatically deployed and rotated into the deployed position shown in FIG. 5. For example, the boom extensions 600 may be spring loaded, such that when a system failure is sensed, or when it is sensed that the motors stop working, a latch may be moved and the spring loaded boom extensions may be spring-driven to rotate into a deployed position about pivot axis 602. Various other means of moving the boom extensions into the deployed position may also be used, including rotary actuators and the like.

Figure 6:
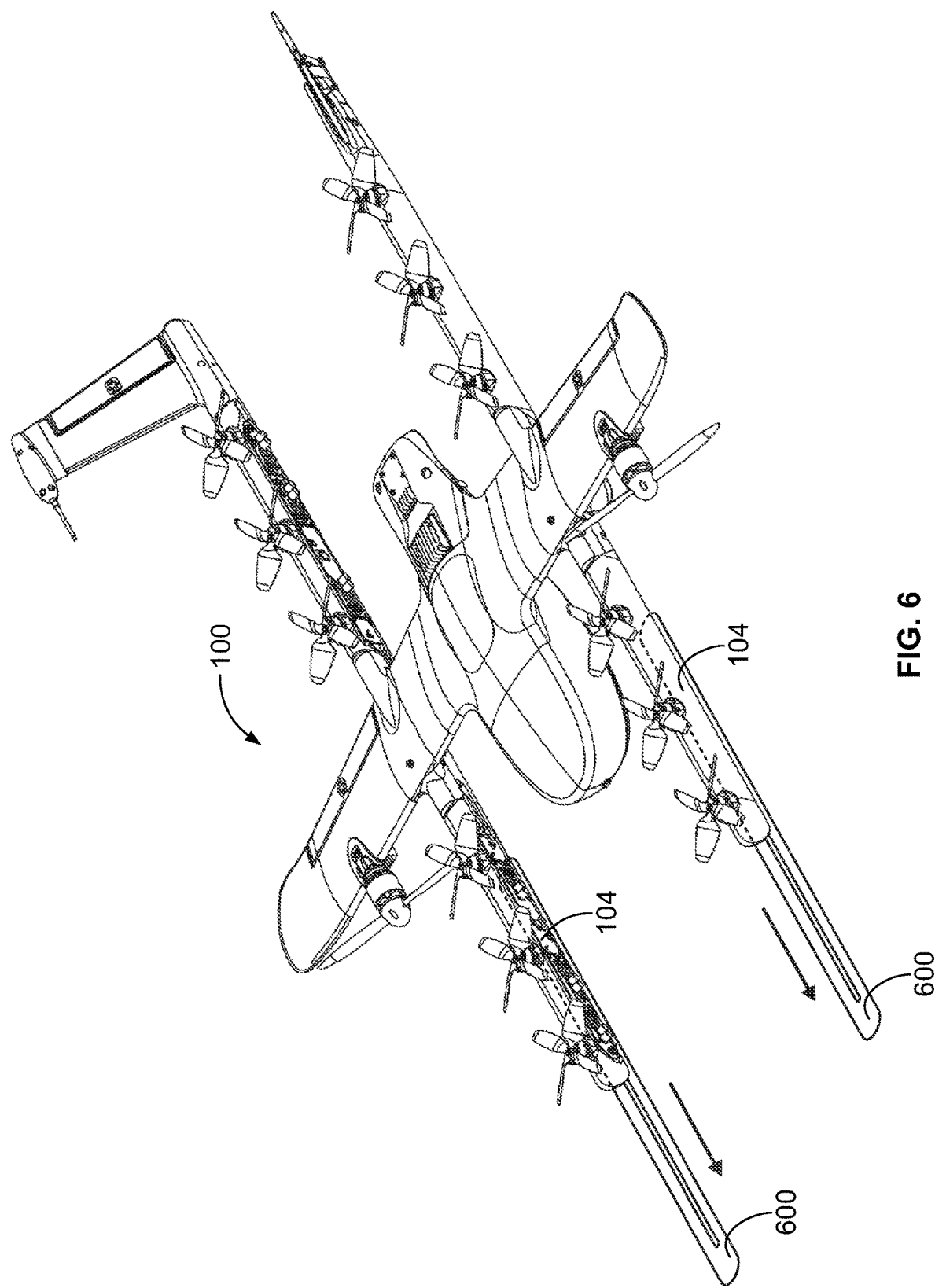
FIG. 6 is a perspective view of aerial vehicle 100 having boom extensions 600 moved linearly into a deployed position in front of booms 104, according to an example embodiment.

FIG. 6 is a perspective view of aerial vehicle 100 having boom extensions 600 moved linearly into a deployed position in front of booms 104, according to an example embodiment. In FIG. 6, boom extensions 600 are moved forward in a linear manner to move into the deployed position shown. Linear movement of boom extensions 600 may be achieved using a linear actuator, a cylinder, or be spring-driven, among others ways of deploying the boom extensions 600 in a linear manner. Boom extensions 600 shown deployed in FIG. 6 operate in the same manner as boom extensions 600 shown in FIG. 5, but are deployed differently.

Figure 7A:
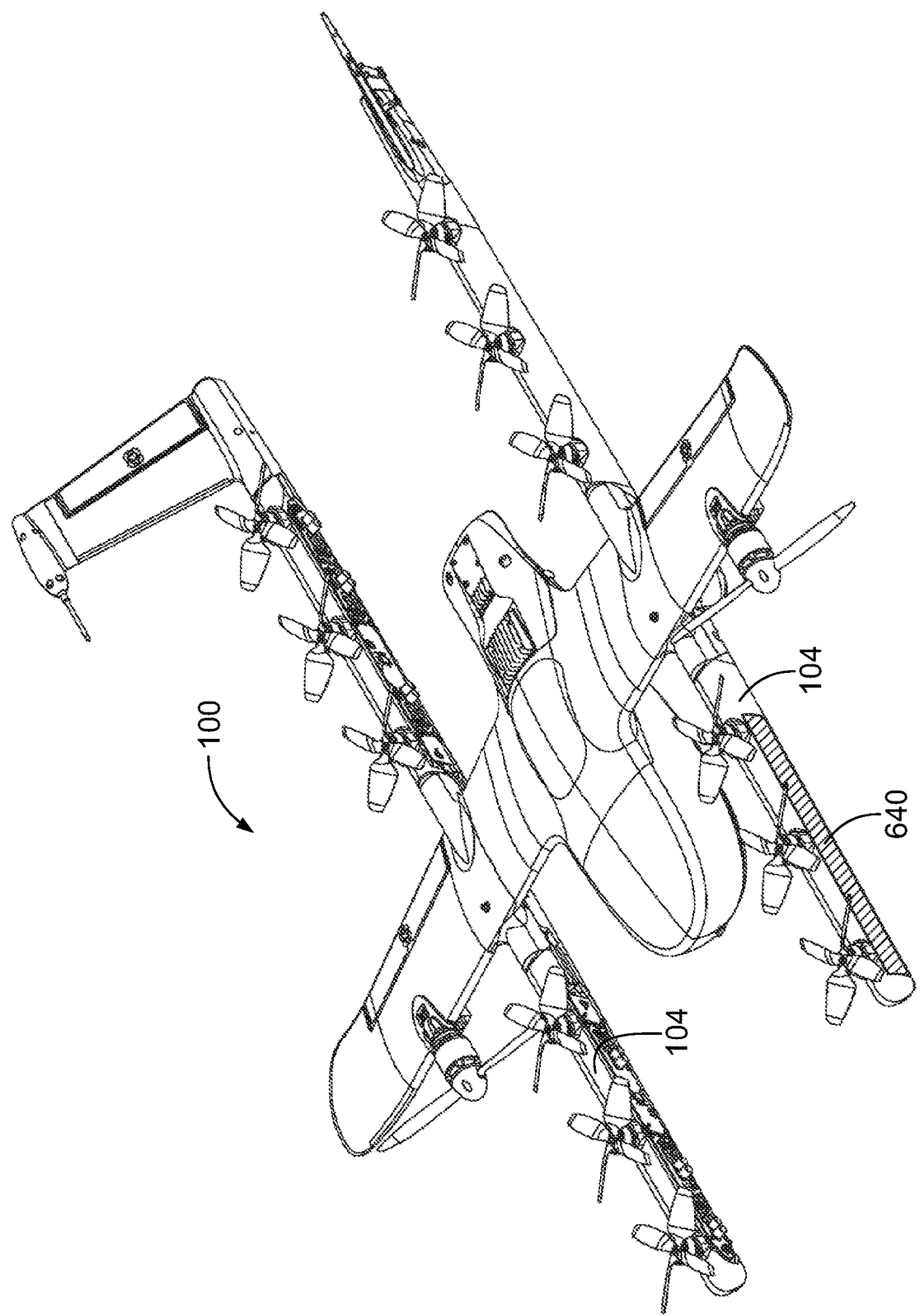
FIG. 7A is a perspective view of aerial vehicle 100 having boom extension side boards 640 shown in an undeployed position, according to an example embodiment.
Figure 7B:
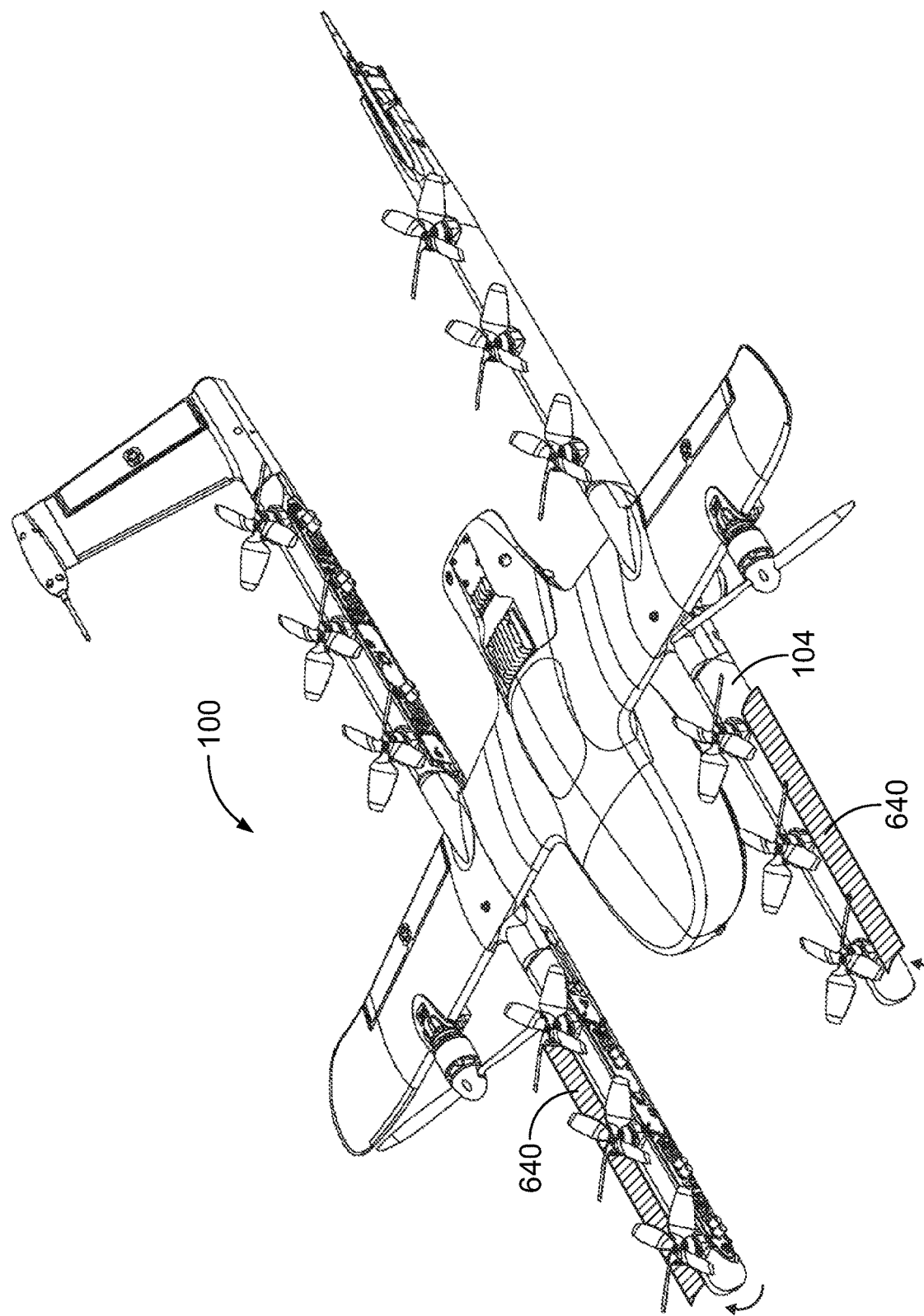
FIG. 7B is a perspective view of aerial vehicle 100 shown in FIG. 7A with boom extension side boards 640 shown in a deployed position on the side of booms 104, according to an example embodiment.

FIG. 7A is a perspective view of aerial vehicle 100 having boom extension side boards 640 shown in an undeployed position, according to an example embodiment. FIG. 7B is a perspective view of aerial vehicle 100 shown in FIG. 7A with boom extension side boards 640 shown in a deployed position on the side of booms 104, according to an example embodiment. In FIG. 7B, the boom extension side boards 640 are shown rotated into the deployed position along the side of booms 104. As with nose plate 500 and boom extensions 600 described above, the greater surface area at the front of the UAV achieved by deployment of boom extension side boards 640 moves the center of pressure forward, or in alignment with, the center of gravity of the UAV, causing the UAV to remain in a forward flight or hover orientation, with a large surface area providing maximum drag on the UAV to slow the descent of the UAV towards the ground.

When the motors stop working, the boom extension side boards 640 may be automatically deployed and rotated into the deployed position shown in FIG. 7B. For example, the boom extension side boards 640 may be spring loaded, such that when a system failure is sensed, or when it is sensed that the motors stop working, a latch may be moved and the spring loaded boom extension side boards 640 may be spring-driven to rotate into a deployed position next to booms 104. Various other means of moving the boom extension sideboards into the deployed position may also be used, including rotary actuators and the like.

Boom extensions 600 and boom extension side boards 640 are an alternative to nose plate 500 for moving the center of pressure towards, or in alignment with, the center of gravity of UAV 100. It will be appreciated that the description of nose plate 500, boom extensions 600, and boom extension sideboards 640 have been illustrated on UAV 100. However, they may also be used on any other type of UAV, including those illustrated in FIGS. 1B-1D, as well as any other type of UAV.

Nose plate 500, boom extensions 600, and boom extension sideboards 640 may be made of a lightweight material such as styrofoam, plastic, wood, or composite material, fabric, or even lightweight steel such as aluminum which may in turn be strengthened with carbon, wood, plastic, or composite material, or even lightweight metals such as aluminum. In addition, nose plate 500, boom extensions 600, and boom extension sideboards 640 are shown with particular configurations; however, they may also have any variety of configurations and geometries, such that any type of geometry or configuration may be used as a deployable surface to provide the desired increased surface area upon deployment.

Figure 8A:
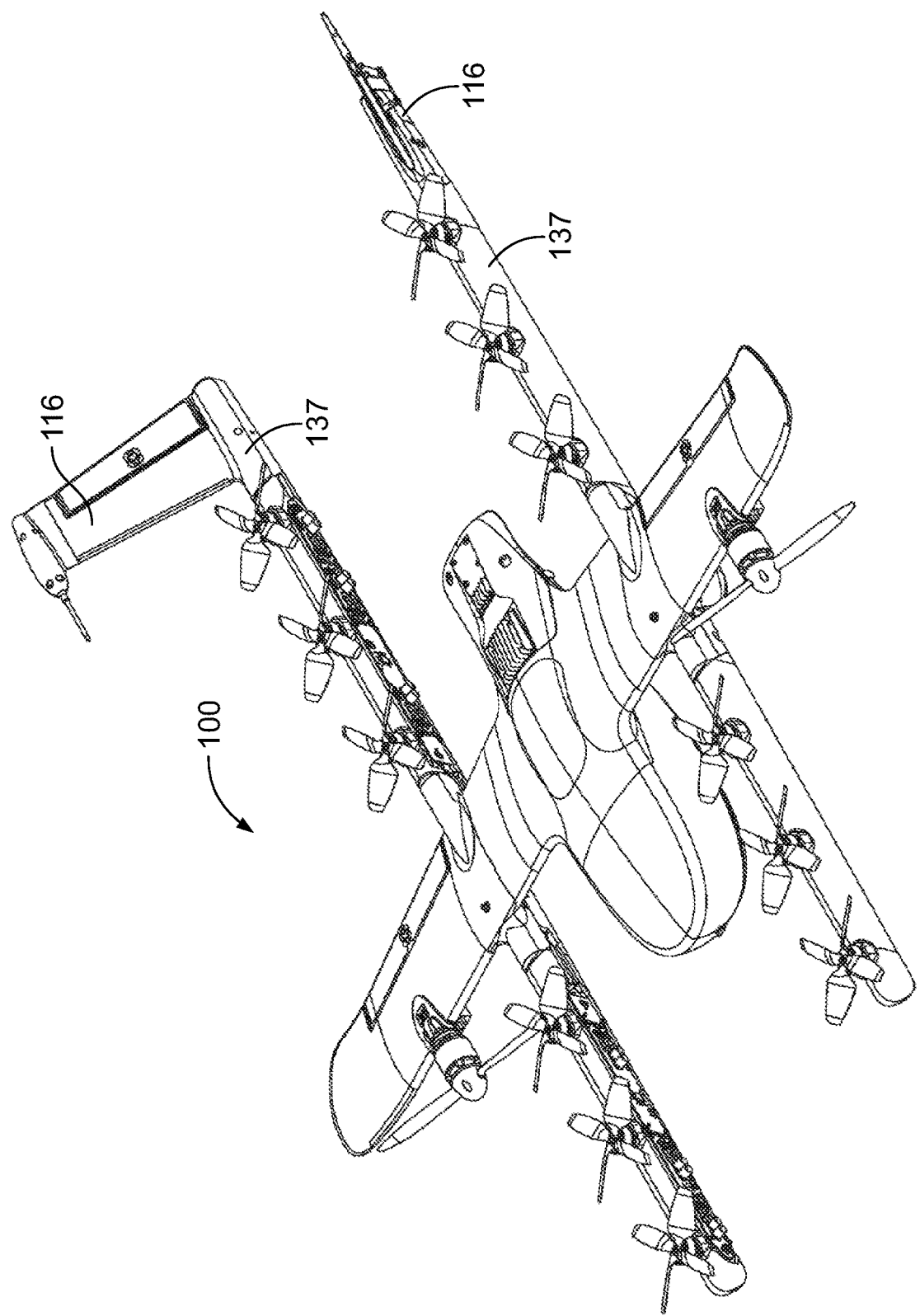
FIG. 8A is a perspective view of aerial vehicle 100 with vertical stabilizers 116 extending from rear booms 137, according to an example embodiment.
Figure 8B:
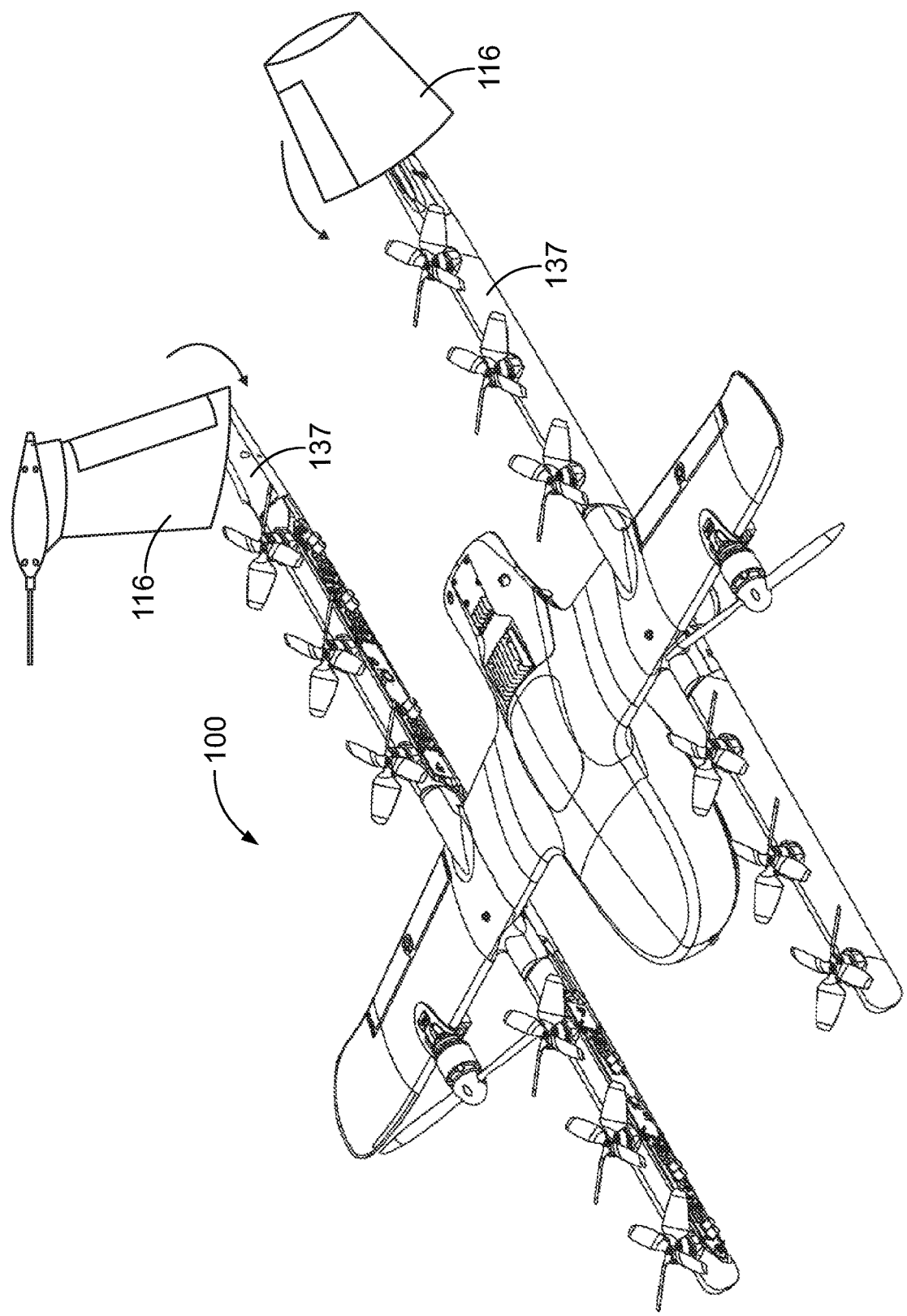
FIG. 8B is a perspective view of aerial vehicle 100 shown in FIG. 8A with vertical stabilizers 116 rotated, according to an example embodiment.

FIG. 8A is a perspective view of aerial vehicle 100 with vertical stabilizers 116 extending from rear booms 137, according to an example embodiment. FIG. 8B is a perspective view of aerial vehicle 100 shown in FIG. 8A with vertical stabilizers 116 having been rotated, according to an example embodiment. When the UAV experiences a system failure and/or the motors stop working, the vertical stabilizers 116 may be rotated, from 0 to 90 degrees (or angles in between) to have a major surface of the vertical stabilizers facing in the direction of flight to reduce lift and move the center of pressure of the UAV towards, or in alignment with, the center of gravity of the UAV, thereby serving the same purpose as deploying deployable surfaces 500, 600, and 640 described above.

Figure 9:
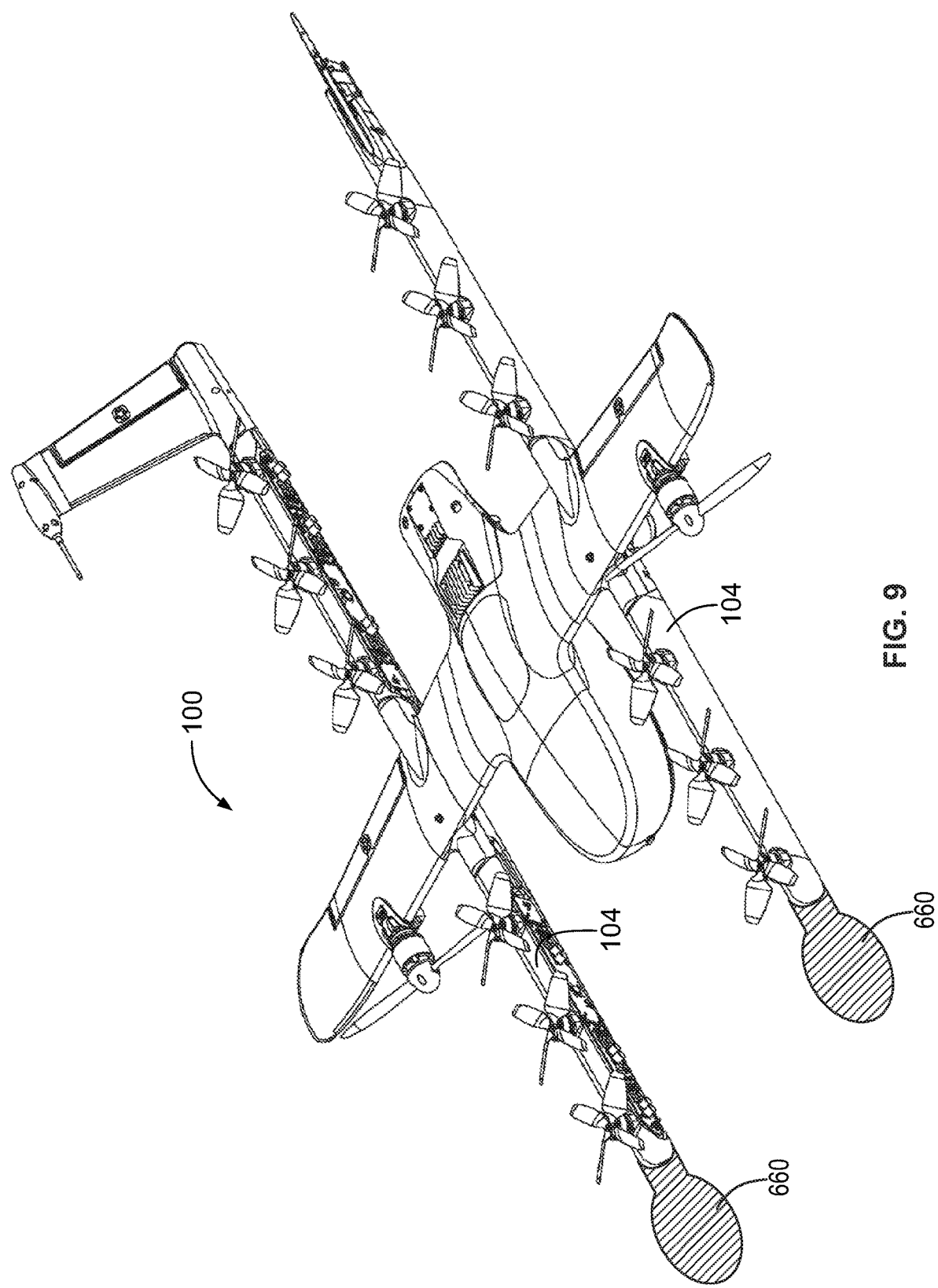
FIG. 9 is a perspective view of aerial vehicle 100 having fixed boom extensions 660, according to an example embodiment.

FIG. 9 is a perspective view of aerial vehicle 100 having fixed boom extensions 660, according to an example embodiment. Fixed boom extensions serve to increase the downward facing surface area of booms 104, thereby moving the center of pressure closer to the center of gravity of UAV 100 in the case of uncontrolled, powerless flight. Thus, fixed boom extensions 660 are deployed at all times and the UAV does not need to sense when there is system failure and/or the motors stop working.

Figure 10A:
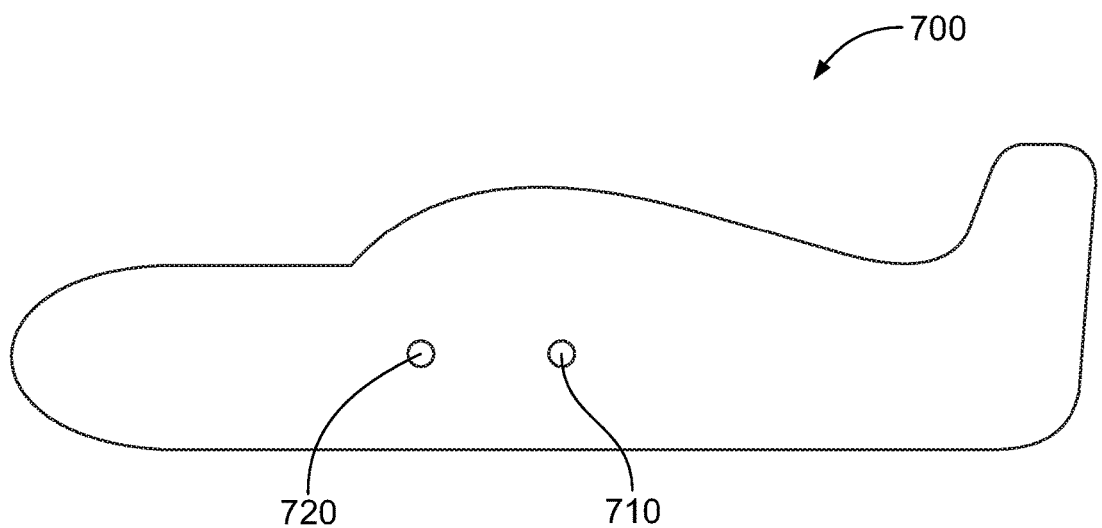
FIG. 10A is an illustration of a UAV 700 showing the position of the center of pressure 710 and the center of gravity 720 during a normal stable forward flight.
Figure 10B:
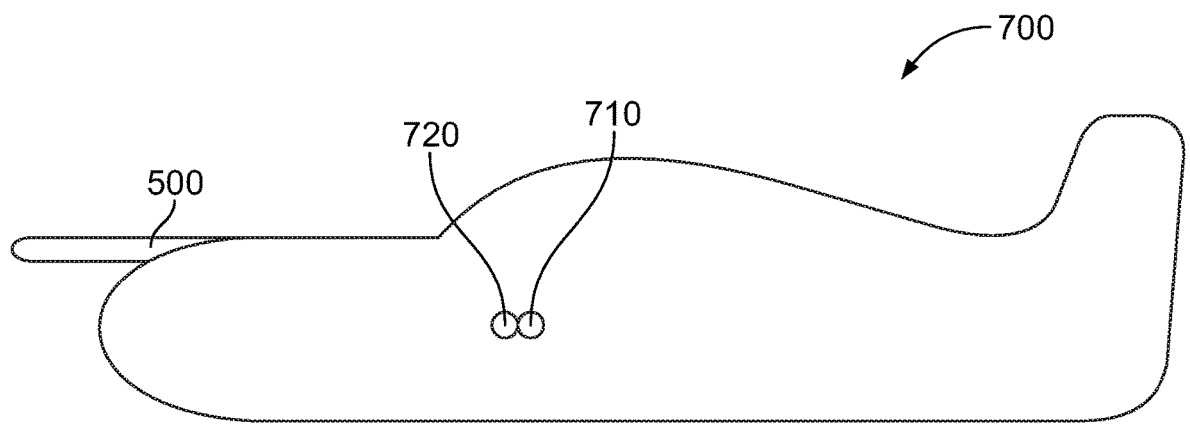
FIG. 10B is an illustration of UAV 700 with the deployable surface 500, shown in a deployed state, illustrating how the center of pressure 710 has moved towards the center of gravity 720 after the surface 500 has been deployed.

FIG. 10A is an illustration of a UAV 700 showing the position of the center of pressure 710 and the center of gravity 720 during a normal stable forward flight. FIG. 10B is an illustration of UAV 700 with the deployable surface 500, such as the nose plate, boom extensions, or boom extension sideboards shown in a deployed state, illustrating how the center of pressure 710 has moved towards the center of gravity 720 after the surface 500 has been deployed.

It should be noted that a parachute could be used to slow the descent of the UAV when there is a system failure and/or the motors stop working. However, a parachute runs the risk of being fouled in the motors or failing to deploy properly. Therefore, the deployable surfaces are better suited to provide for a soft landing in the event of a system failure and/or the motors stop working.

VII. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An unmanned aerial vehicle (UAV) comprising:
a fuselage;
a pair of wings extending outwardly from the fuselage; and
a deployable surface moveable from a first undeployed position during normal flight to a second deployed position when there is a system failure during flight;
wherein the fuselage includes a nose section and the deployable surface is a nose plate that extends forwardly from the nose section of the UAV when the nose plate is in the second deployed position.

2. The UAV of claim 1, wherein the nose plate is deployable by rotating about a pivot point in the nose section.

3. The UAV of claim 1, wherein the nose plate is deployable by moving forward linearly from the nose section.

4. An unmanned aerial vehicle (UAV) comprising:
a fuselage;
a pair of wings extending outwardly from the fuselage; and
a deployable surface moveable from a first undeployed position during normal flight to a second deployed position when there is a system failure during flight;
wherein the UAV includes first and second booms that extend forwardly in a direction parallel to a nose section of the UAV; and
wherein the deployable surface comprises a first boom extension on the first boom and a second boom extension on the second boom.

5. The UAV of claim 4, wherein the first boom extension is deployable by rotating about a pivot axis on the first boom into the second deployed position extending forwardly from the first boom; and
wherein the second boom extension is deployable by rotating about a pivot axis on the second boom into the second deployed position extending forwardly from the second boom.

6. The UAV of claim 4, wherein the first boom extension is deployable by moving forward linearly from the first boom into the second deployed position extending forwardly from the first boom; and
wherein the second boom extension is deployable by moving forward linearly from the second boom into the second deployed position extending forwardly from the second boom.

7. The UAV of claim 4, wherein the first boom extension is deployable by rotating about a longitudinal pivot axis on the first boom into the second deployed position extending to a side of the first boom; and
wherein the second boom extension is deployable by rotating about a longitudinal pivot axis on the second boom into the second deployed position extending to a side of the second boom.

8. The UAV of claim 1, wherein deployment of the deployable surfaces moves a center of pressure of the UAV towards, or in alignment with, a center of gravity of the UAV.

9. The UAV of claim 4, wherein the first boom also extends rearwardly from the pair of wings and the deployable surface comprises a vertical stabilizer that extends from the first boom; and
wherein the second boom also extends rearwardly from the pair of wings and the deployable surface comprises a vertical stabilizer that extends from the second boom.

10. The UAV of claim 9, wherein the vertical stabilizer on the first boom is rotatable about a pivot axis on the first boom to the second deployed position with a major surface of the vertical stabilizer positioned facing a direction of forward travel of the UAV; and
wherein the vertical stabilizer on the second boom is rotatable about a pivot axis on the second boom to the second deployed position with a major surface of the vertical stabilizer positioned facing a direction of forward travel of the UAV.

11. A method of adjusting a center of pressure of a UAV comprising the steps of:
providing a UAV with a fuselage, a pair of wings extending outwardly from the fuselage, and a deployable surface moveable from a first undeployed position during normal flight to a second deployed position when there is a system failure during flight;

sustaining a system failure;
moving the deployable surface from the first undeployed position to the second deployed position;
wherein the fuselage includes a nose section and the deployable surface comprises a nose plate that extends forwardly from the nose section of the UAV when the nose plate is in the second deployed position.

12. The method of claim 11, wherein moving the nose plate to the second deployed position comprises rotating the nose plate about a pivot point in the nose section.

13. The method of claim 11, wherein moving the nose plate to the second deployed position comprises moving the nose plate forward linearly from the nose section.

14. A method of adjusting a center of pressure of a UAV comprising the steps of:
providing a UAV with a fuselage, a pair of wings extending outwardly from the fuselage, and a deployable surface moveable from a first undeployed position during normal flight to a second deployed position when there is a system failure during flight;
sustaining a system failure;
moving the deployable surface from the first undeployed position to the second deployed position;
wherein the UAV includes first and second booms that extend forwardly in a direction parallel to the nose section; and
wherein the deployable surface comprises a first boom extension on the first boom and a second boom extension on the second boom.

15. The method of claim 14, wherein moving the first boom extension to the second deployed position comprises rotating the first boom extension about a pivot axis on the first boom to a position extending forwardly from the first boom; and
wherein moving the second boom extension to the second deployed position comprises rotating the second boom extension about a pivot axis on the second boom to a position extending forwardly from the second boom.

16. The method of claim 14, wherein moving the first boom extension to the second deployed position comprises moving the first boom extension forward linearly from the first boom into a position extending forwardly from the first boom; and
wherein moving the second boom extension to the second deployed position comprises moving the second boom extension forward linearly from the second boom into a position extending forwardly from the second boom.

17. The method of claim 14, wherein moving the first boom extension to the second deployed position comprises rotating the first boom extension about a pivot axis on the first boom into a position extending to a side of the first boom; and
wherein moving the second boom extension to the second deployed position comprises rotating the second boom extension about a pivot axis on the second boom into a position extending to a side of the second boom.

18. A method of adjusting a center of pressure of a UAV comprising the steps of:
providing a UAV with a fuselage, a pair of wings extending outwardly from the fuselage, and a deployable surface moveable from a first undeployed position during normal flight to a second deployed position when there is a system failure during flight;
sustaining a system failure;
moving the deployable surface from the first undeployed position to the second deployed position;
wherein deployment of the deployable surfaces moves a center of pressure of the UAV towards or in alignment with a center of gravity of the UAV.

* * * * *